No. 629,542. Patented July 25, 1899.
T. J. BURFIELD.
MULTIPLYING ATTACHMENT FOR PHOTOGRAPHIC CAMERAS.
(Application filed Aug. 22, 1898.)
(No Model.)

Witnesses
Theo Lagaard
C. H. Roseman

Inventor
Thomas J. Burfield
By P. H. Gunckel.
his Attorney

THE NORRIS PETERS CO., PHOTO-LITHO., WASHINGTON, D. C.

UNITED STATES PATENT OFFICE.

THOMAS J. BURFIELD, OF WACONIA, MINNESOTA.

MULTIPLYING ATTACHMENT FOR PHOTOGRAPHIC CAMERAS.

SPECIFICATION forming part of Letters Patent No. 629,542, dated July 25, 1899.

Application filed August 22, 1898. Serial No. 689,204. (No model.)

*To all whom it may concern:*

Be it known that I, THOMAS J. BURFIELD, of Waconia, in the county of Carver and State of Minnesota, have invented a certain new and useful Improvement in Multiplying Attachments for Photographic Cameras, of which the following is a specification.

My invention relates to photographic cameras for producing by successive exposures a plurality of adjacent negatives on a single plate from which a picture may be developed having the appearance of being the result of a single exposure.

The object of my invention is to provide an improved apparatus for properly regulating and determining the proportionate widths of the successive exposures and the resultant negatives on the plate. The devices employed for the purpose are a box or frame arranged within an ordinary camera between the lens and plate relatively near the latter and slides within it adapted to be shifted laterally to any desired relative positions for making successive openings of desired width and means for increasing or diminishing the distance between such slides and the plate-holder. Suitable marks or graduations are provided along the path of movement of the slides in order that the edges of the successive negatives may be made substantially on the same lines, all of which will be more fully explained hereinafter.

My improvements are illustrated in the accompanying drawings, in which—

Figure 1:
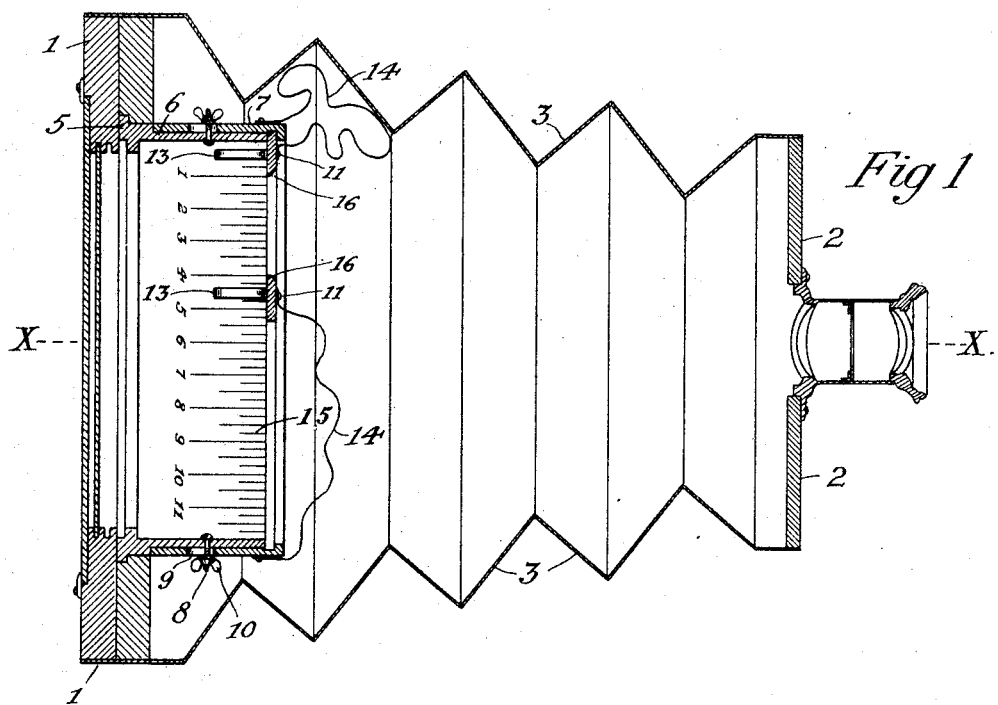
Figure 2:
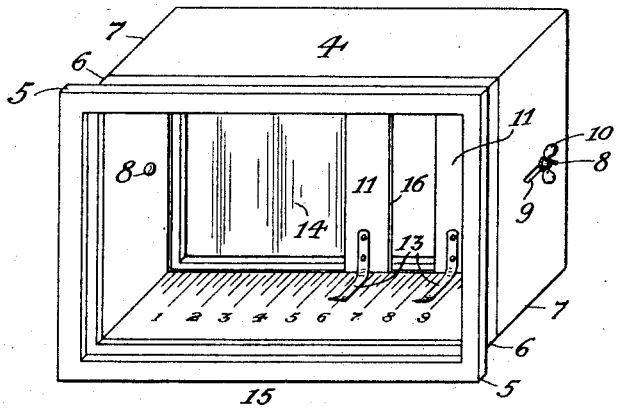
Figure 3:
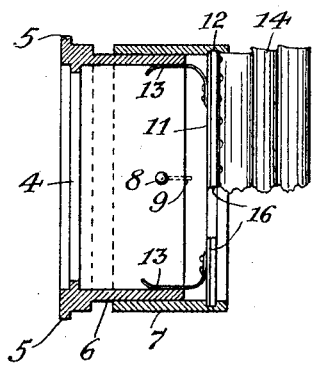

Figure 1 is a longitudinal sectional view of an ordinary bellows camera provided with my improvements. Fig. 2 is a perspective view of the box or frame containing the slides adapted to be inserted in such camera; and Fig. 3 is a vertical section of such box on the line $x$ $x$ of Fig. 1, some parts being broken away.

In the drawings, 1 designates the frame or plate-holding portion of the camera, 2 the lens-holding portion, and 3 the usual bellows connection for those members.

The preferred way of supporting my improved slides within the camera is by means of a box 4, open at both ends and secured by a flange 5 or otherwise to the frame 1. The box sides are made of overlapping parts 6 and 7, with bolts 8 secured to the one member and passing through slots 9 in the other member and provided with thumb-nuts 10 on their exposed threaded portions, whereby the box as a whole may be lengthened or shortened and secured in places of adjustment, as desired.

Two or more slides 11 at the inner end of the box are arranged to travel in ways 12 or between suitable guides for keeping them in upright positions, and to further maintain them in positions of adjustment springs 13, attached to the slides and bearing against the bottom and top, or equivalent devices may be employed. These slides are preferably narrow and have attached to their respective outer edges flexible fabric 14 of any suitable kind, which in turn is secured to the inner ends of the sides of the box, so that the slides may be moved laterally to any desirable extent and the spaces intervening between them and the box sides closed and obscured by the fabric. Such arrangement permits both slides to be moved outward toward their respective sides, so as to make a full exposure, and permits either or both to be moved at will laterally inward, so as to contract the opening and have it at or near the middle or near one side. In order that when one slide is advanced the other may be moved to the exact position previously occupied by the former, the bottom of the box is provided with suitable marks or graduations 15, which for convenience may represent inches and fractions of inches. The adjacent or inner edges of the slides are beveled, as shown at 16, to produce somewhat sharp lines of shadows and avoid having too much blur along the margins of the negatives for satisfactory blending of the lines or union of successive negatives.

In operation the devices of the improvement, as will be obvious, will not interfere with taking pictures of full width and may be used by narrowing the opening to produce as narrow negatives as desired. To produce a series of successive negatives capable of being developed in the production of pictures having the appearance of a single-exposure photograph, the slides may be arranged at any less distance apart than the full width and adjusted for a second exposure, having the margin coincident with the margin of the last preceding negative. For instance, for making three successive exposures of equal width the slides may be arranged as shown in Fig. 1 for the first exposure, the one slide having its edge coincident with the one-inch mark and the other with the four-inch mark. Then for the second exposure both slides are moved so that the edge of the one will coincide with the four-inch mark and the other with the seven-inch mark, and for the third exposure the one would be coincident with the seven-inch mark and the other with the ten-inch mark.

In order to determine the necessary distance between the slides and the plate-holder to produce the best results for any given size of camera and lens, tests should be made by a succession of exposures in the manner suggested, and if the lines of juncture of the negatives appear dark the distance should be increased, and if such lines appear light the distance should be lessened to the extent necessary. Such changes are made by sliding one portion of the box on the other and operating the thumb-nuts, as described above. The relative distance between the plate and slides necessary in cameras and lenses of different sizes and kinds would of course vary somewhat, but no difficulty would be experienced by a practical operator in readily adjusting the parts to the required extent.

Having described my invention, what I claim is—

1. The combination with a photographic camera, of interior slides arranged to be adjusted laterally to produce successive partial plate exposures, and means for regulating the distance between said slides and plate, substantially as described.

2. The combination with a photographic-camera box, of an interior frame having a fixed portion adjacent to the plate-holder and an inner portion adjustable as to its distance from the fixed portion, the frame bottom being provided with suitable markings for indicating successive positions to which slides are moved, and slides carried by said adjustable frame member and arranged to be moved laterally toward or away from each other to produce successive photographic exposures, substantially as set forth.

In testimony whereof I have hereunto set my hand this 15th day of August, 1898.

THOMAS J. BURFIELD.

Witnesses:
  H. R. VOLKENANT,
  GEO. MACK.